(12) United States Patent
Neil et al.

(10) Patent No.: US 7,694,321 B1
(45) Date of Patent: Apr. 6, 2010

(54) PROGRAM GUIDE PROCESSING

(75) Inventors: Mao Uong Neil, Indianapolis, IN (US); Michael Joseph McLane, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1771 days.

(21) Appl. No.: 10/031,056

(22) PCT Filed: Jul. 19, 2000

(86) PCT No.: PCT/US00/19631

§ 371 (c)(1),
(2), (4) Date: Jan. 15, 2002

(87) PCT Pub. No.: WO01/06772

PCT Pub. Date: Jan. 25, 2001

Related U.S. Application Data

(60) Provisional application No. 60/144,457, filed on Jul. 19, 1999.

(51) Int. Cl.
*H04N 5/445* (2006.01)

(52) U.S. Cl. .............................. 725/43; 725/39; 725/41; 725/44; 725/52

(58) Field of Classification Search .................. 725/53, 725/52, 43, 41, 44
See application file for complete search history.

(56) References Cited

FOREIGN PATENT DOCUMENTS

| EP | 0682452 | 11/1995 |
|---|---|---|
| EP | 0735750 | 10/1996 |
| EP | 0834798 | 4/1998 |
| EP | 0924927 | 6/1999 |
| WO | 99/04561 | 1/1999 |
| WO | WO 99/04561 | * 1/1999 |

* cited by examiner

*Primary Examiner*—John W. Miller
*Assistant Examiner*—Sumaiya A Chowdhury
(74) *Attorney, Agent, or Firm*—Robert D. Shedd; Harvey D. Fried; Joel M. Fogelson

(57) ABSTRACT

A system and method for providing two modes of operation for a program guide and a video display depending on the position of a highlight or cursor. When the cursor or highlight is moved to a channel name/number grid, the video display will display program content of the program currently being received by the highlighted channel. On the other hand, when the cursor or highlight is moved to a program grid, the content of the video window does not change.

12 Claims, 8 Drawing Sheets

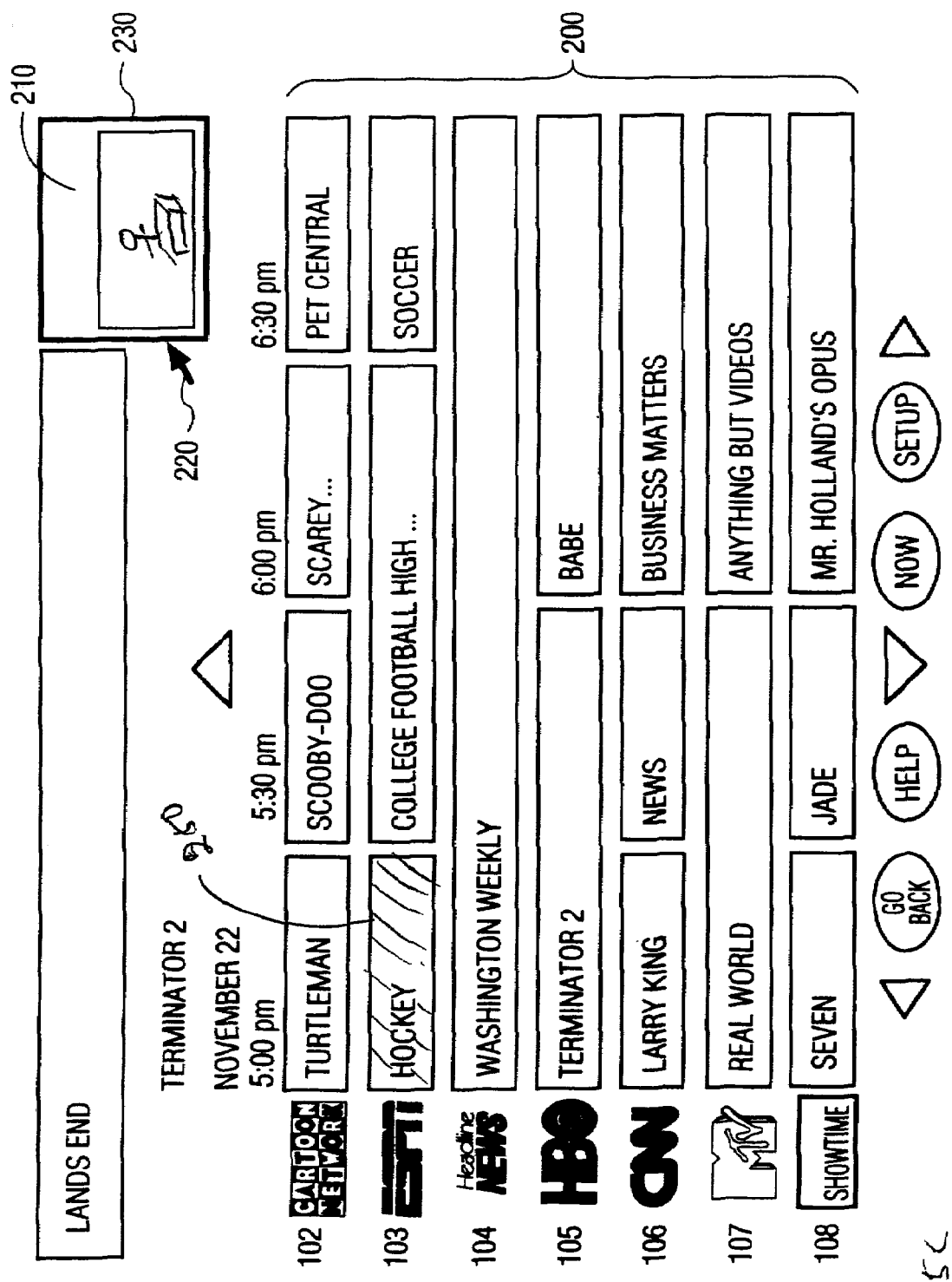

PROGRAM GUIDE PROCESSING

This application claims the benefit under 35 U.S.C. § 365 of International Application PCT/US00//19631, filed Jul. 19, 2000, which was published in accordance with PCT Article 21(2) on Jan. 25, 2001 in English; and which claims benefit of U.S. provisional application Ser. No. 60/144,457 filed Jul. 19, 1999.

FIELD OF INVENTION

This invention generally relates to the field of program guide information processing and more particularly, to a system and method of processing and displaying a video along with or within a program guide.

BACKGROUND OF INVENTION

Electronic devices such as televisions and personal computers (PCs) require a control system that includes a user interface system. Typically, a user interface provides information to a user and simplifies use of the device. One example of a user interface is an electronic program guide (EPG) in a television system.

An EPG is an interactive, on-screen display feature that displays information analogous to TV listings found in local newspapers or other print media. In addition, an EPG also includes information necessary for collating and decoding programs. An EPG provides information about each program within the time frames covered by the EPG that typically ranges from the next hour up to several days. The information contained in an EPG includes programming characteristics such as channel number, program title, start time, end time, elapsed time, time remaining, rating (if available), topic, theme, and a brief description of the program's content. EPGs are usually arranged in a two-dimensional table or grid format with time information on one axis and channel information on the other axis.

Unlike non-interactive guides that reside on a dedicated channel and merely scroll through the current programming on the other channels for the next 2 to 3 hours, EPGs allow viewers to interactively select any channel at any time during some period into the future, e.g., up to seven days forward. Further EPG features include the ability to highlight individual cells of the grid containing program information. Once highlighted, the viewer can perform functions pertaining to that selected program. For instance, the viewer may be able to instantly switch to that program if it is currently being aired. Viewers could also program one touch video cassette recording (VCR) or the like if the television is properly configured and connected to a recording device. Such EPGs are known in the art and used for example, in direct satellite system (DSS) receiver made by Thomson Consumer Electronics of Indianapolis, Ind., U.S.A.

In addition, U.S. Pat. No. 5,515,106, issued to Chaney et. al., and assigned to the same assignee of the present invention, describes in detail an exemplary embodiment including data packet structure necessary to implement an exemplary program guide system. The exemplary data packet structure is designed so that both the channel information (e.g., channel name, call letters, channel number, type, etc.) and the program description information (e.g., title, rating, star, etc.) relating to a program may be transmitted from a program guide database provider to a receiving apparatus efficiently.

User interfaces such as EPGs are applicable to analog and digital television systems or the like, including VCRs, set top boxes, personal viewing device containing a hard disk for storage and replay of programs, and to other electronic devices such as personal computers. As electronic devices become increasingly complex with a multitude of features, the need for a robust and easy-to-use user interface becomes ever more important. For example, separate electronic systems having respective interfaces for controlling features of each system are now being combined into a single system requiring a single user interface. One specific example is the so-called PC/TV (e.g., a PC and TV convergence product) which includes features of both a personal computer and a television. The user interface system for such a device must provide both clear communication of computer and television related information and provide for simple control of both computer and television related features.

SUMMARY OF INVENTION

The present inventors recognize that there are drawbacks with some of the existing EPG systems. In particular, some of the current EPG systems are capable of showing, for example, an associated program video in a window along side with or within an EPG. This can be done, for example, by scaling a received video and inserted into it to a picture-in-a-picture window, as is well know in the art. In the current systems, the video program being displayed in the window is typically a program corresponding to the program grid being highlighted and/or selected within the EPG. In other implementations, however, the video is locked to a certain channel, regardless of where the highlight or focus is in the EPG. Therefore, in this implementation, the video in the window always shows the same program when a user is "surfing" the channels using the EPG.

The present inventors recognize that it may be desirable to have both the locked and unlocked display modes when a user is using a program guide to channel surf, especially without the need for additional user set up or any extra key presses. In other words, it would be desirable to provide a user with both capabilities with an easy and consistent user interface as before.

Therefore, in one form, the present invention provides two modes of operation for a program guide and a video display depending on the position of a highlight, cursor or focus. When the cursor, highlight or focus is moved to a channel name/number grid, the video display will display program content of the program currently being received by the highlighted channel. On the other hand, when the cursor, highlight or focus is moved to a program grid, the content of the video window does not change.

BRIEF DESCRIPTION OF THE DRAWINGS

In the drawings:

FIGS. 5A-C show exemplary embodiments of the present invention.

DETAILED DESCRIPTION

Figure 1:
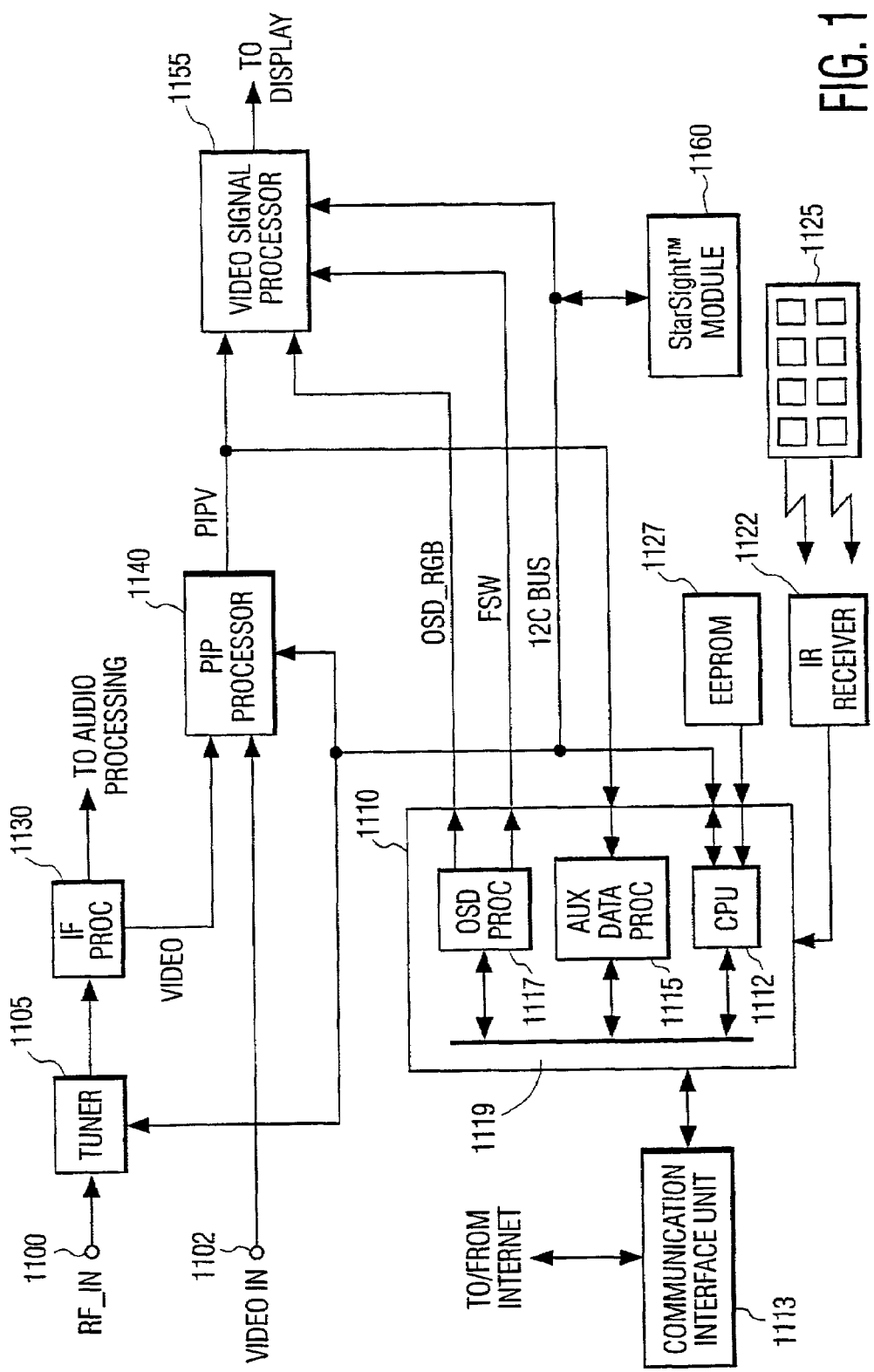
FIG. 1 shows an example of a television system suitable for processing program guide information in accordance with the present invention.

FIG. 1 shows an example of a television system suitable for processing and displaying program guide information and associated video information in accordance with the present invention. The television receiver shown in FIG. 1 is capable of processing both analog NTSC television signals and internet information. The system shown in FIG. 1 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operate in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 1) for further audio processing. Although FIG. 1 shows input 1102 as a baseband signal, the television receiver could include a second tuner and IF processor similar to units 1105 and 1130 for producing a second baseband video signal from either signal RF_IN or from a second RF signal source.

The system shown in FIG. 1 also includes a main microprocessor (mP) 1110 for controlling components of the television receiver such as tuner 1105, picture-in-picture processing unit 1140, video signal processor 1155, and StarSight® data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus I²C BUS which utilizes the well-known I²C serial data bus protocol. More specifically, central processing unit (CPU) 1112 within mP 1110 executes control programs contained within memory, such as EEPROM 1127 shown in FIG. 1, in response to commands provided by a user, e.g., via IR remote control 1125 and IR receiver 1122. For example, activation of a "CHANNEL UP" feature on remote control 1125 causes CPU 1112 to send a "change channel" command along with channel data to tuner 1105 via I²C BUS. As a result, tuner 1105 tunes the next channel in the channel scan list. Other examples of control programs stored in EEPROM 1127 are software for implementing the operations shown in FIG. 5 in accordance with the present invention as to be discussed below.

Main microprocessor 1110 also controls the operation of a communications interface unit 1113 for providing the capability to upload and download information to and from the internet. Communication interface unit 1113 includes, for example, a modem for connecting to an internet service provider, e.g., via a telephone line or via a cable television line. The communication capability allows the system shown in FIG. 1 to provide email capability and internet related features such as web browsing in addition to receiving television programming.

CPU 1112 controls functions included within mP 1110 via bus 1119 within mP 1110. In particular, CPU 1112 controls auxiliary data processor 1115 and on-screen display (OSD) processor 1117. Auxiliary data processor 1115 extracts auxiliary data such as StarSight® data from video signal PIPV.

StarSight® data which provides program guide data information in a known format is typically received only on a particular television channel and the television receiver must tune that channel to extract StarSight® data. To prevent StarSight® data extraction from interfering with normal use of the television receiver, CPU 1112 initiates StarSight® data extraction by tuning the particular channel only during a time period when the television receiver is usually not in use (e.g., 2:00 AM). At that time, CPU 1112 configures decoder 1115 such that auxiliary data is extracted from horizontal line intervals such as line 16 that are used for StarSight® data. CPU 1112 controls the transfer of extracted StarSight® data from decoder 1115 via I²C BUS to StarSight® module 1160. A processor internal to the module formats and stores the data in memory within the module. In response to the StarSight® EPG display being activated (e.g., a user activating a particular key on remote control 125), CPU 1112 transfers formatted StarSight® EPG display data from StarSight® module 1160 via I²C BUS to OSD processor 1117.

OSD processor 1117 operates in a conventional manner to produce R, G, and B video signals OSD_RGB that, when coupled to a display device, will produce a displayed image representing on-screen display information such as graphics and/or text comprising an EPG. OSD processor 1117 also produces control signal FSW which is intended to control a fast switch for inserting signals OSD_RGB into the system's video output signal at times when an on-screen display is to be displayed. For example, when a user enables an EPG, e.g., by activating a particular switch on remote control 1125, CPU 1112 enables processor 1117. In response, processor 1117 produces signals OSD_RGB representing the program guide data information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 1), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

For an EPG display, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG display using information such as program guide data from StarSight® module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes a control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

The processing and displaying of a program guide in accordance with the present invention may be implemented using a combination of software and hardware. For example, referring to FIG. 1, display of an EPG may be implemented by software in memory such as EEPROM 1127. Activation of an EPG, e.g., by a user pressing an EPG related button on remote control 1125, causes CPU 1112 to execute the EPG software routine. As part of generating an EPG display, CPU 1112 also accesses EPG data and graphics that may be stored in Star-Sight module 1160 via the I2C bus. Under control of the EPG software routine stored in EEPROM 1127, CPU 1112 enables OSD processor 1117 which formats the EPG data into a form suitable for producing an OSD representing the EPG data and graphics. The OSD data produced by OSD processor 1117 is coupled to video signal processor (VSP) 1155 via signal lines OSD_RGB. A fast switch in VSP 1155 couples the EPG OSD data to the output of VSP 1155 under control of signal FSW. That is, the software routine being executed by CPU a 1112 determines when the EPG data is to be displayed (e.g., what portion of the display) and sets signal FSW to the appropriate state for causing the fast switch to couple the EPG data to the output.

Figure 5A:
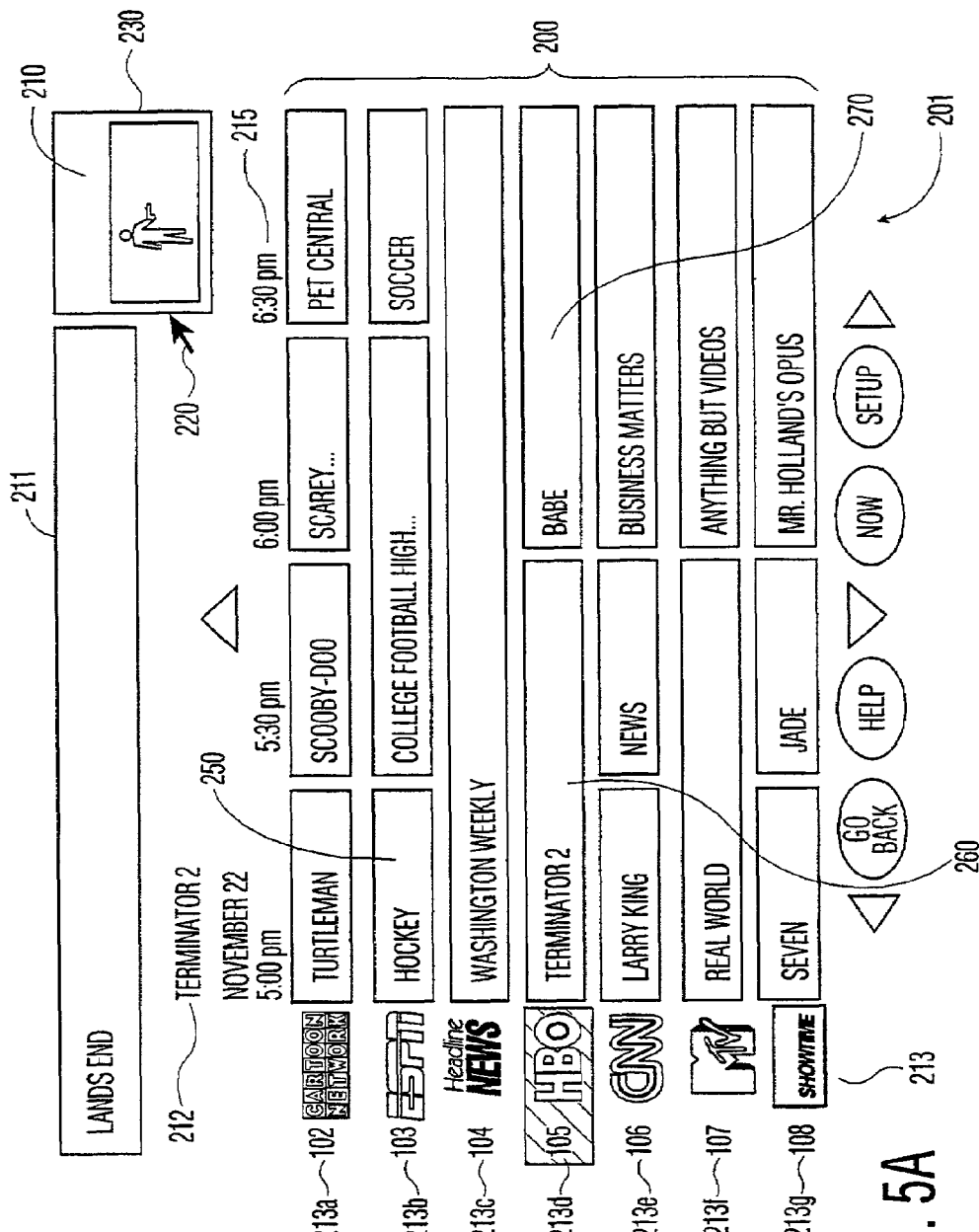
Figure 5B:
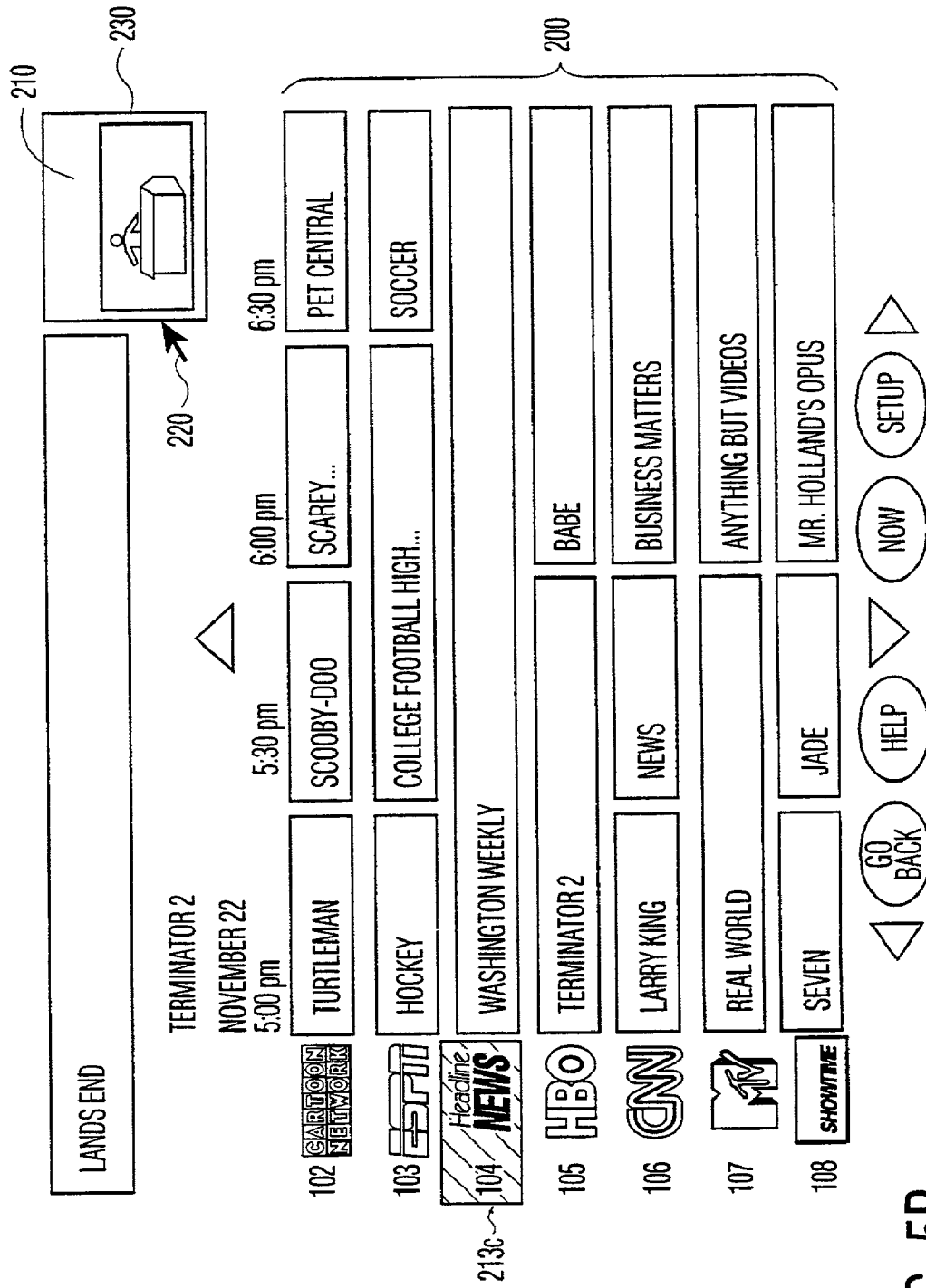

An exemplary embodiment of the features of the system shown in FIG. 1 that have been described thus far comprises an ST9296 microprocessor produced by SGS-Thomson Microelectronics for providing the features associated with mP 1110; an M65616 picture-in-picture processor produced by Mitsubishi for providing the described basic PIP functionality associated with PIP processor 1140; and an LA7612 video signal processor produced by Sanyo for providing the functions of VSP 1155. As mentioned before, the PIP processor may be used to produce a video window 230 as shown in FIGS. 5A to 5C in accordance with the principles of the present invention.

Figure 2:
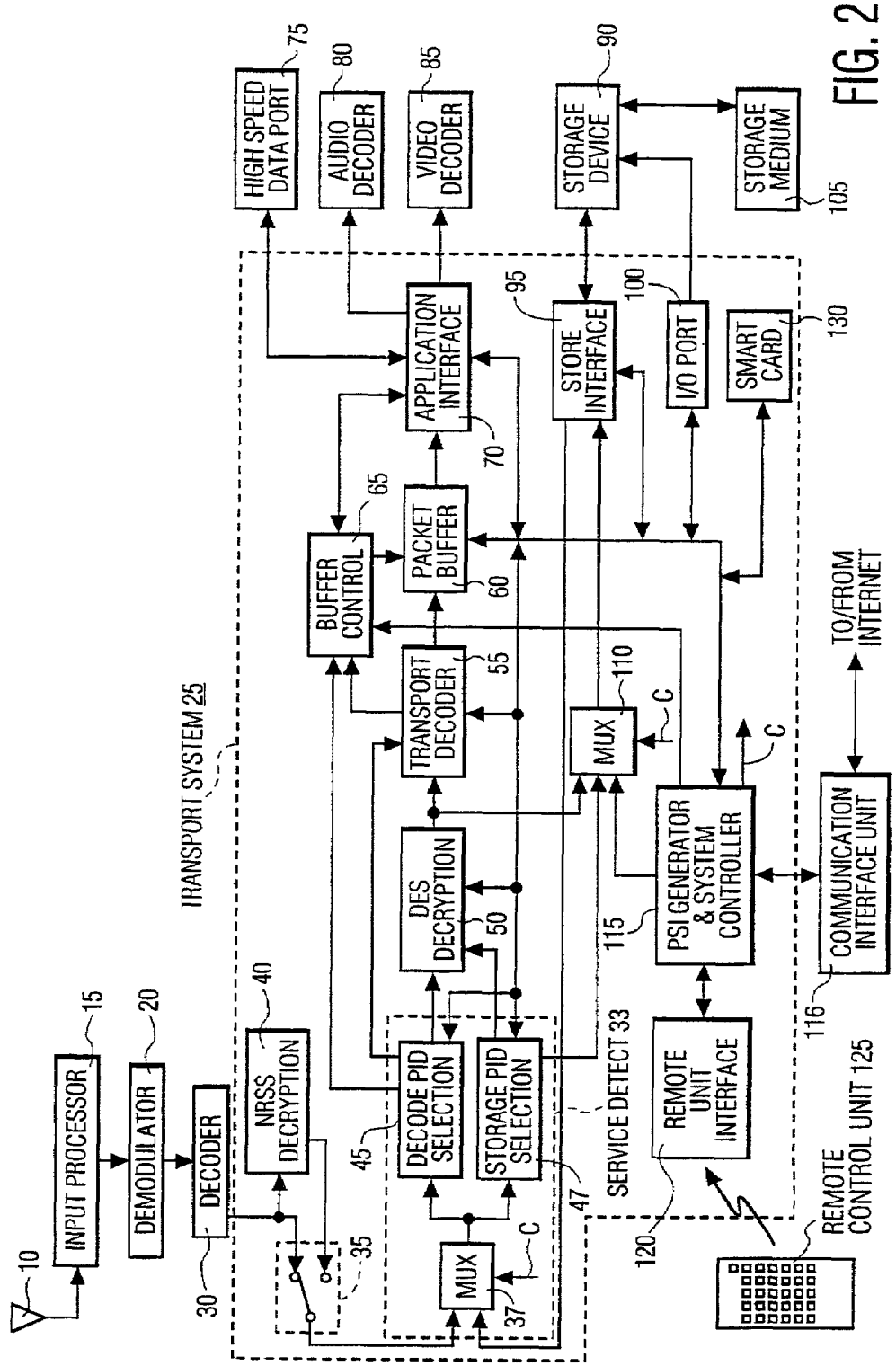
FIG. 2 shows an example of a digital video processing apparatus suitable for processing program guide information in accordance with the present invention.

FIG. 2 shows another example of an electronic device capable of processing and displaying program guide information in accordance with the present invention. As described below, the system shown in FIG. 2 is an MPEG compatible system for receiving MPEG encoded transport streams representing broadcast programs. However, the system shown in FIG. 2 is exemplary only. User interface systems are also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV". Further, although the system described below is described as processing broadcast programs, this is exemplary only. The term 'program' is used to represent any form of packetized data such as telephone messages, computer programs, internet data or other communications, for example.

In overview, in the video receiver system of FIG. 2, a carrier modulated with video data is received by antenna 10 and processed by unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

Considering FIG. 2 in detail, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an internet service provider via the communication interface unit 116. The individual packets that comprise either particular program channel content or Program Guide information, are identified by their Packet Identifiers (PIDs) contained within header information. As discussed above, the program description may comprise different program descriptive fields such as title, star, rating, etc., relating to a program.

The user interface incorporated in the video receiver shown in FIG. 2 enables a user to activate various features by selecting a desired feature from an on-screen display (OSD) menu. The OSD menu may include an electronic program guide (EPG) as described above and other features discussed below. Data representing information displayed in the OSD menu is generated by system controller 115 in response to stored program guide information, stored graphics information, and/or program guide and graphics information received via the input signal (e.g., StarSight data) as described above and in accordance with exemplary control programs to be shown in FIG. 5 and to be discussed below. The software control programs may be stored, for example, in embedded memory (not shown) of system controller 115.

Using remote control unit 125 (or other selection means such as a mouse) a user can select from the OSD menu items such as a program to be viewed, a program to be stored, the type of storage media and manner of storage. System controller 115 uses the selection information, provided via interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. This approach places all security related functions in one removable unit that can easily be replaced if a service provider decides to change encryption technique or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50.

The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input datastream and/or pre-stored on the insertable smart card itself (International Standards Organization document ISO 7816-3 of 1989 defines the interface and signal structures for a smart card system).

The packets provided by units 45 and 47 to unit 50 are encrypted using an encryption techniques such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to an HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 1. That is, unit 116 provides the capability to upload and download information to and from the internet. Communication interface unit 116 includes, for example, a modem for connecting to an internet service provider, e.g., via a telephone line or via a cable television line. The communication capability allows the system shown in FIG. 2 to provide email capability and internet related features such as web browsing in addition to receiving television programming.

Figure 3:
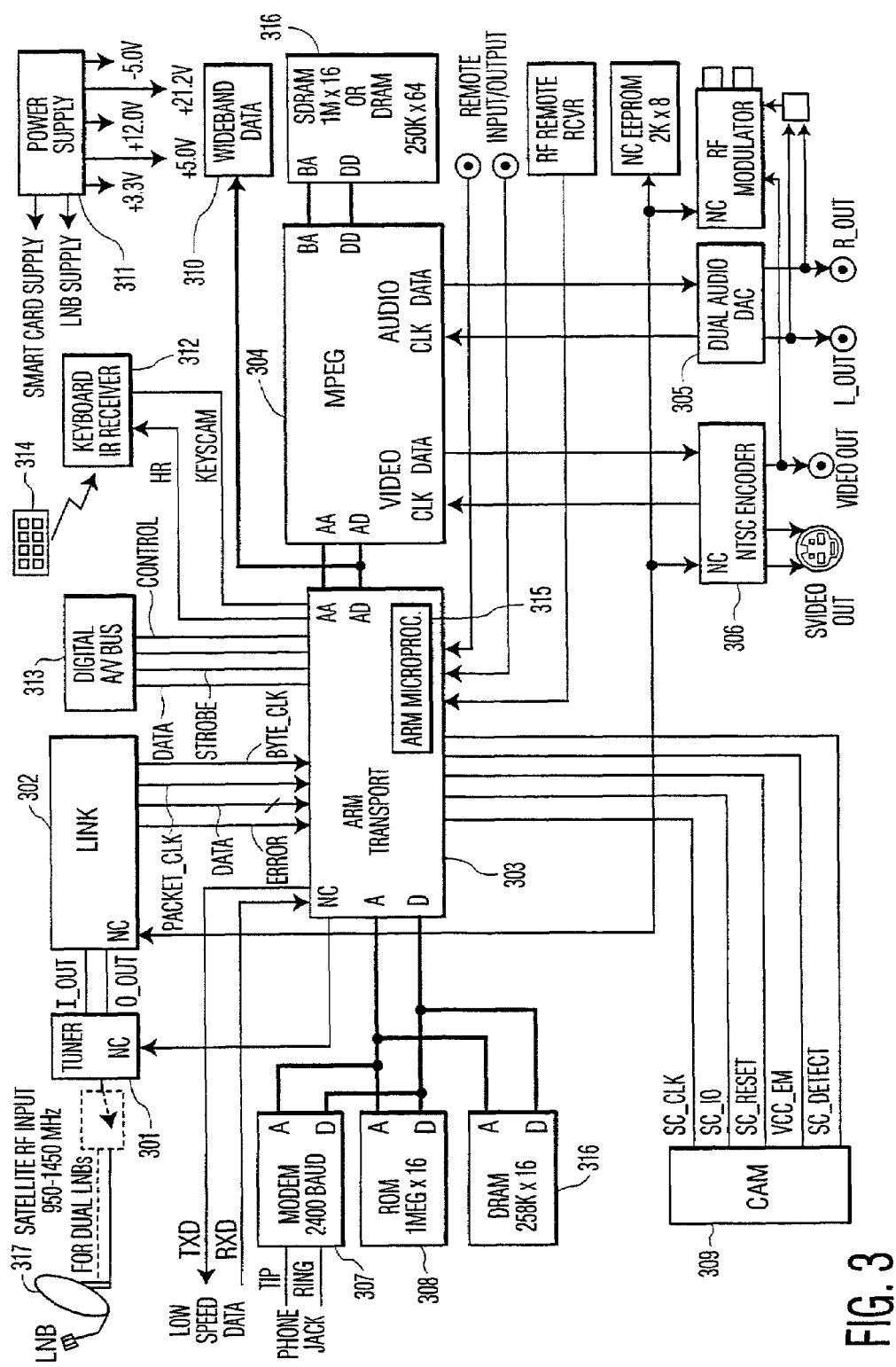
FIG. 3 shows a block diagram of a specific implementation of a digital satellite system suitable for processing program guide information in accordance with the present invention.

FIG. 3 is a specific implementation of an electronic device generally shown in FIG. 2 and described in detail above. FIG. 3 represents a satellite receiver set-top box, designed and manufactured by Thomson Consumer Electronics, of Indianapolis, Ind., USA, for receiving DirecTV™ satellite service provided by Hughes Electronics.

As shown in FIG. 3, the set-top box has a tuner 301 which receives and tunes applicable satellite RF signals in the range of 950-1450 Mhz from a satellite antenna 317. The tuned analog signals are outputted to a link module 302 for further processing. Link module 302 is responsible for further processing of the analog tuned signals I_out and Q_out from tuner 301, including filtering and conditioning of the analog signals, and conversion of the analog signals into a digital output signal, DATA. The link module 302 is implemented as an integrated circuit (IC). The link module IC is manufactured by SGS-Thomson Microelectronics of Grenoble, France, and has Part No. ST 15339-610.

The digital output, DATA, from the link module 302 consists of compliant packetized data stream recognized and processable by the transport unit 303. The datastream, as discussed in detail in relation to FIG. 2, includes program guide data information and the data content of one or more program channels of the satellite broadcast service from Direct TV.

The function of the transport unit 303 is the same as the transport system 25 shown in FIG. 2 and discussed already. As described above, the transport unit 303, processes the packetized datastream according to the Packet Identifiers (PID) contained in the header information. The processed datastream are then formatted into MPEG compatible, compressed audio and video packets and coupled to a MEPG decoder 304 for further processing.

The transport unit 303 is controlled by an Advanced RISC Microprocessor (ARM) 315 which is a RISC based microprocessor. The ARM processor 315 executes control software residing in ROM 308, one component of the software may be, for example, a control program shown in FIG. 6 for processing the applicable program guide information in accordance with aspects of the present invention as will be discussed below.

The transport unit 303 may be implemented as an integrated circuit. For example, a preferred embodiment of a transport unit may be an IC manufactured by SGS-Thomson Microelectronics having a Part No. ST 15273-810 or 15103-65C.

The MEPG compatible, compressed audio and video packets from the transport unit 303 are delivered to a MEPG decoder 304. The MPEG decoder decodes the compressed MPEG datastream from the transport unit 303. The decoder 304 then outputs the applicable audio stream which can be further processed by the audio digital-to-analog converter (DAC) 305 to convert the digital audio data into analog sound. The decoder 304 also outputs applicable digital video data which represents image pixel information to a NTSC encoder 306. The NTSC encoder 306 then further processes this video data into NTSC compatible analog video signal so that video images may be displayed on a regular NTSC television screen. The MPEG decoder as described above may also implemented as an integrated circuit. A preferred embodiment of a MPEG decoder is an IC manufactured by SGS-Thomson Microelectronics having Part No. ST i3520.

Additional relevant functional blocks of FIG. 3 includes modem 307 which corresponds to the communication interface unit 116 shown in FIG. 2 for access to the internet, for example. Conditional Access Module (CAM) 309, corresponds to the NRSS decryption unit 130 shown in FIG. 2 for providing conditional access information. Wideband data module 310 corresponds to High Speed Data Port 75 shown in FIG. 2 for providing high speed data access to, for example, a HDTV decoder or a computer. A keyboard/IR Receiver module 312 corresponds to Remote Unit interface 120 shown in FIG. 2 for receiving user control commands from a user control unit 314. Digital AV bus module 313 corresponds to I/O port 100 shown in FIG. 2 for connection to an external device such as a VCR or a DVD player.

Figure 6:
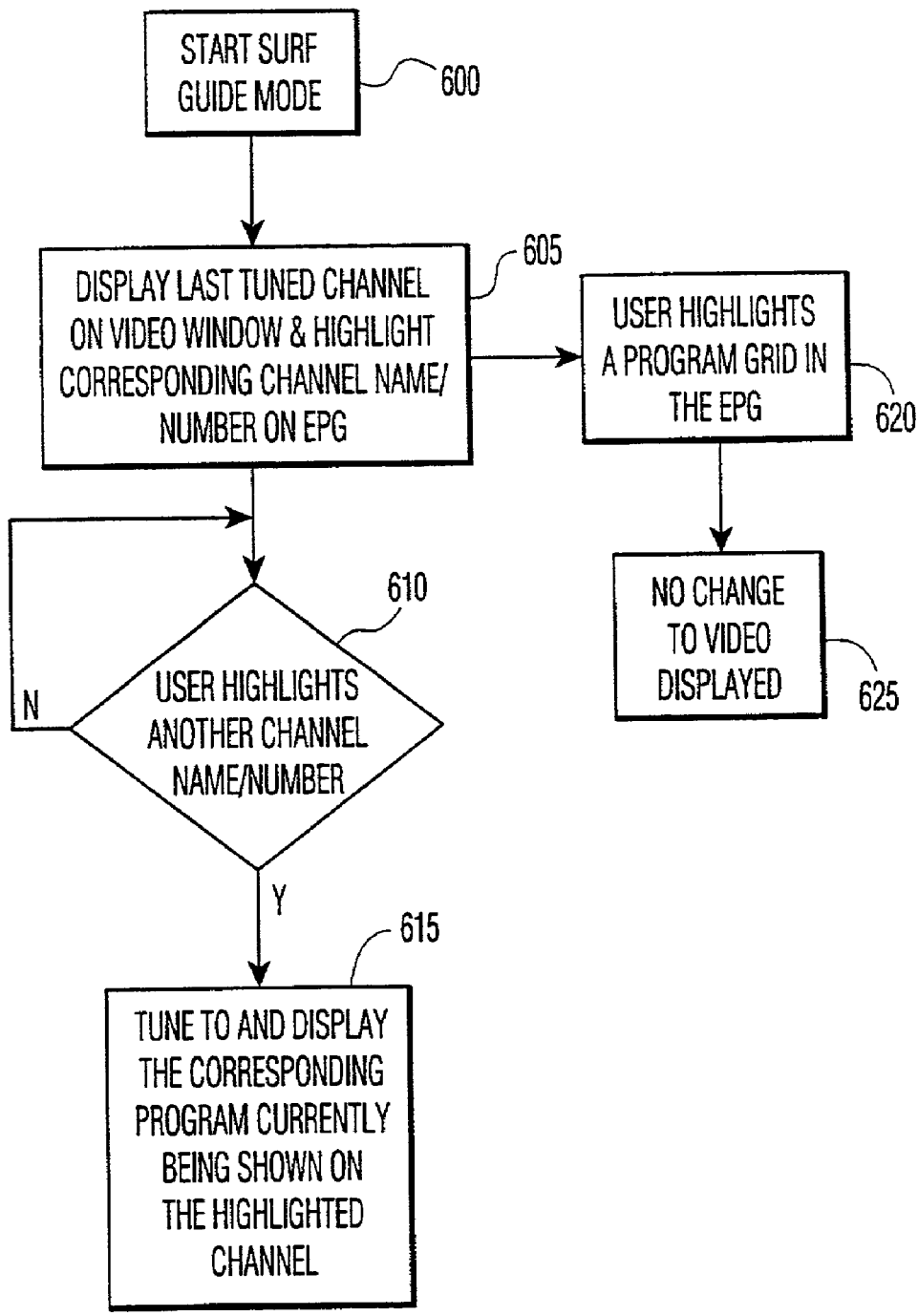
FIG. 6 shows an exemplary flow diagram in accordance with the present invention.

FIG. 6 shows an exemplary flow chart of a control program which may be executed by either the CPU 1112 of FIG. 1, Controller 115 of FIG. 2 or ARM microprocessor 315 of FIG. 3 to implement features according to aspects of the present invention. A person skilled in the art would readily recognize that the control program when executed by any one of the systems described in FIGS. 1-3 will provide the same features in accordance with the present invention. Therefore, to avoid redundancy, the control program in FIG. 6 will be described below only with respect to the exemplary hardware implementation shown in FIG. 3.

When a user turns on the system, for example, as shown in FIG. 3, the system will typically first display a video image of a program previously selected by the user for viewing. The user then may press, for example, a "GUIDE" button (not shown) on a user control unit 314 to display an electronic program guide.

Figure 4:
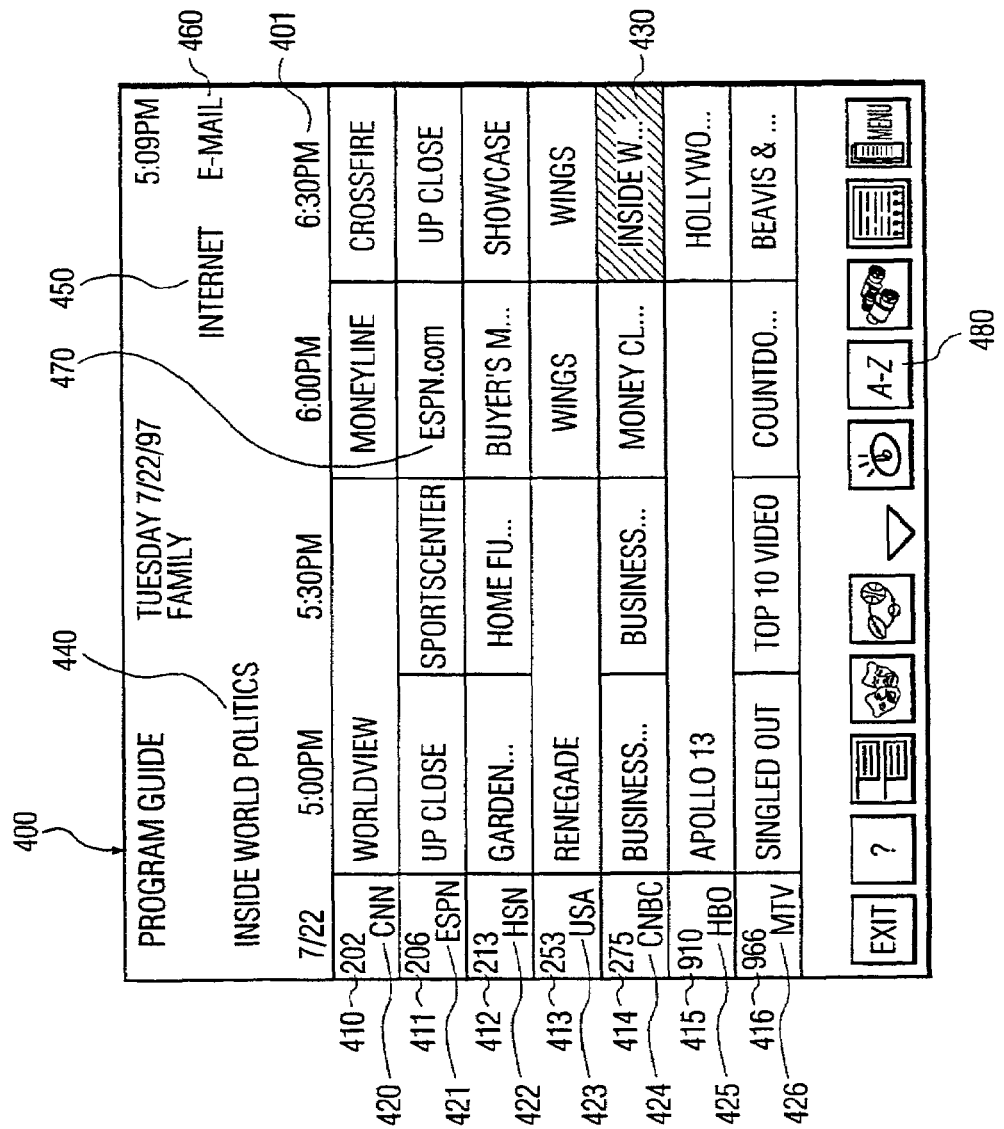
FIG. 4 shows an example of a program guide being displayed.

In our exemplary embodiment, upon detecting this user request, the ARM microprocessor 315 in the transport unit 303 processes the program guide data information obtained from a data stream provided by a program guide information provider and formats the guide data information into OSD pixel data corresponding to a full "grid guide" as shown in FIG. 4. The OSD pixel data from the transport unit 303 is forwarded to the MPEG audio/video decoder 304 for generating the guide image, as described before.

The "grid guide" 400 typically occupies the whole screen of a display. The grid guide shows a program schedule in a time-and-channel format, similar to a TV schedule listed in a newspaper. In particular, one axis (e.g., horizontal) of the guide shows the time information while the other axis (e.g., vertical) of the guide shows the channel information. The time information is conveyed to the user by having a time line 401 on the top portion of the guide and is demarcated by half hour intervals. The channel information is conveyed to the user by channel numbers 410-416 and corresponding channel station names 420-426.

In addition, the program guide 400 contains icons Internet 450 and Email 460. By clicking on these icons, a user can surf the internet and send/receive email respectively through the communication interface unit 307. In addition, an internet web site icon may also be incorporated into a grid of a program guide. For example, by clicking on "ESPN.com" within grid 470, the user will automatically be linked to, for example, an ESPN web site.

As illustrated in FIG. 6, a user of an EPG system according to the principles of the present invention may bring up a "surf guide" mode to facilitate channel surfing using an EPG, as shown in step 600 of FIG. 6, by using, for example, a key (not shown) on remote controller 314, this will cause the system of FIG. 3, for example, to display a screen shown in FIG. 5A.

FIG. 5A shows a screen 201 comprising a program guide 200 and a picture or video window 230. Screen 201 also includes an advertisement banner 211 and a program description banner 212. The program guide 200 comprises a channel axis 213, including a plurality of channel numbers and associated channel names 213 a-g, a time axis 215, and a plurality of program grids, for example, 250, 260 and 270, corresponding to various programs.

Picture window 230 may be located in any corner of the screen 201 and will display, for example, a program 210 that was selected before the surf guide mode was accessed by the user, as shown in step 605. In another exemplary embodiment, the picture window may comprise a size up to the whole screen 201, and be superimposed as the background of a translucent program guide 200. In addition, the channel name/number which was showing the selected program 210 before the "surf guide" mode is entered into, will also be highlighted, as show also in step 605. For example, as shown in FIG. 5A, the video content of video program "Terminator 2" on HBO, channel 105, will being shown in video window 230, when a user first entered the surf guide mode.

Subsequently, as shown in steps 610 and 615 of FIG. 6, if a user moves the highlight or focus of a cursor up or down (for example, using an up/down key on a remote) to another channel number/name of the program guide, the ARM microprocessor 315 in the transport unit 303 will cause tuner 301 to tune to the highlighted channel and display the received video image on window 230. This is also illustrated in FIG. 5B, which shows that the user has caused the highlight to move to channel 104/Headline News, and therefore, the currently received video content 210, corresponding to the show "Washington Weekly" of channel 104 is now being shown on window 230. Therefore, a user may scroll up and down channel axis 213 and watch the window picture to be tuned to the current program being shown in the corresponding highlighted channel.

On the other hand, if a user moves the highlight or cursor from a grid in the channel axis 213 to one of the grids indicating a program (e.g., 250, 260 or 270), or moves the highlight or cursor within the grids indicating programs, the video content of window 230 stays locked to the last video program being displayed, as illustrated in steps 620 and 625 of FIG. 6. This is shown, for example, as changes from FIGS. 5B to 5C. For example, when a user moves the highlight or cursor from the channel name/number grid 213C to a program grid 250 (e.g., by moving the cursor to right and then up), the video content of the window stays locked to the program currently being shown in channel 104 and does not changed. The user in this mode, may channel surf using the program guide, without the tuner changing the picture in the window.

Hence, the present invention provides two modes of operation for a program guide and a video window depending on the position of a highlight or cursor. When the cursor or highlight is moved to a channel name/number grid, the video window will display program content of the program currently being received by the highlighted channel. On the other hand, when the cursor or highlight is moved to a program grid, the content of the video window does not change.

While this invention has been described as having exemplary design and/or configuration, the present invention can be further modified within principles and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of processing a program guide, comprising the steps of:

determining whether a cell in a channel grid of the program guide has been highlighted;

determining whether a cell in a program grid of the program guide has been highlighted;

displaying, in response to the previous determining steps, program content of a program currently being received by a channel indicated by the highlighted cell in the channel grid, if the cell in the channel grid of the program guide has been highlighted; and continuing to display the same program content, in response to the previous determining steps, if the cell in the program grid of the program guide has been highlighted, wherein the same programming content will continue to be displayed until a different cell corresponding to a different channel in said channel grid is highlighted, upon highlighting the different cell in said channel grid, the programming content of a second program which is currently being received by said different channel corresponding to the different cell that is highlighted is displayed.

2. The method of claim 1 wherein the program content is displayed in a window.

3. The method of claim 2 wherein the window is shown along with the program guide.

4. The method of claim 1 wherein the determining steps are entered into in response to a user selecting a user selectable option.

5. The method of claim 4 wherein the channel grid comprises at least one of channel name or channel number.

6. The method of claim 5 wherein the program grid comprises program title.

7. The method of claim 1 wherein the cells in the program grid and channel grid are independently selectable.

8. An apparatus, comprising:
a user control device;
a display window for displaying a video program;
a control means for displaying a program guide,
wherein the program guide including a channel grid and a program grid; and
determination means for determining whether a cell in the channel grid of the program guide has been highlighted;
determination means for determining whether a cell in the program grid of the program guide has been highlighted;
displaying means for displaying in response to the previous determining steps, program content of a program currently being received by a channel indicated by the highlighted cell in the channel grid, if the cell in the channel grid of the program guide has been highlighted; and
continuing to display the same program content, in response to the previous determining steps, if the cell in the program grid of the program guide has been highlighted, wherein the same program content will continue to be displayed until a different cell corresponding to a different channel in said channel grid is highlighted, upon highlighting the different cell in said channel grid, the programming content of a second program which is currently being received by said different channel corresponding to the different cell that is highlighted is displayed.

9. The apparatus of claim 8 wherein the display window is displayed along with the program guide.

10. The apparatus of claim 9 wherein the channel grid comprises at least one of channel name or channel number.

11. The apparatus of claim 10 wherein the program grid comprises program title.

12. The apparatus of claim 7 wherein the cells in the program grid and channel grid are independently selectable.

* * * * *